K. RUSHTON.
GAGE.
APPLICATION FILED FEB. 7, 1918.

1,272,856.

Patented July 16, 1918.

Inventor;
Kenneth Rushton,
by his Attorneys,
Howson & Howson

UNITED STATES PATENT OFFICE.

KENNETH RUSHTON, OF PHILADELPHIA, PENNSYLVANIA, ASSIGNOR TO THE BALDWIN LOCOMOTIVE WORKS, OF PHILADELPHIA, PENNSYLVANIA, A CORPORATION OF PENNSYLVANIA.

GAGE.

1,272,856.

Specification of Letters Patent.

Patented July 16, 1918.

Application filed February 7, 1918. Serial No. 215,754.

*To all whom it may concern:*

Be it known that I, KENNETH RUSHTON, a citizen of the United States, residing in Philadelphia, Pennsylvania, have invented certain Improvements in Gages, of which the following is a specification.

This invention relates to certain improvements in gages used on machines for indicating either the pressure or vacuum.

One object of my invention is to construct the gage so that the predetermined pressure, which the machine is supposed to carry under normal conditions, will be indicated at the top of the gage and when the machine is working under correct conditions the pointer, or hand, will be in the vertical position. By this construction an operator can ascertain at a glance whether or not the machine is running under proper pressure without having to read the numerals on the gage. Where there are a number of machines running under different pressures an operator, or overseer, can readily discern, when at a distance, whether the machines are carrying the proper pressure.

A further object of the invention is to illuminate the pointer and, in some instances, the marks on the dial, by using a luminous coating so that the pointer can be seen in the dark, as, in a number of cases, the pressure gages are located in places inaccessible to the daylight.

Figure 1:
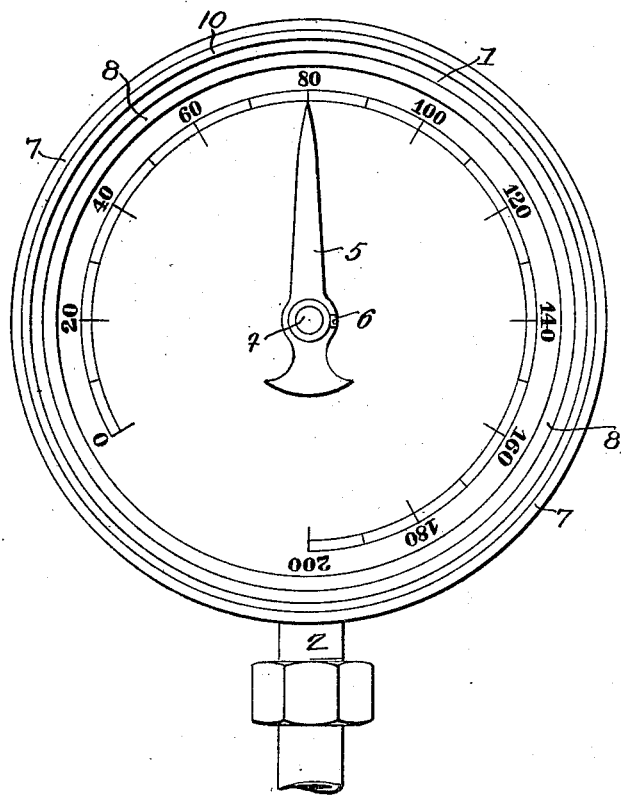
Figure 1 is a face view of a pressure gage illustrating my invention.
Figure 2:
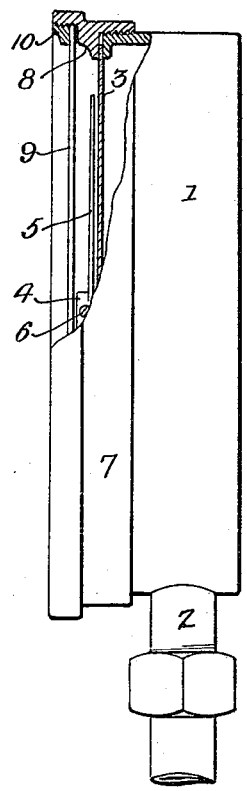
Fig. 2 is a side view, partly in section.

1 is the casing of a pressure gage. 2 is the pressure pipe connected to the casing in the ordinary manner. 3 is the dial having the ordinary gage lines thereon and numerals, as shown. 4 is the shaft connected to the pressure mechanism with the gage, which may be of any of the ordinary types. Mounted on this shaft 4 is a pointer, or hand, 5, adjustably secured to the shaft, in the present instance by a confining screw 6, so that the pointer can be adjusted and secured in the adjusted position. The dial 3 can be turned in the casing so that the marks indicating the predetermined pressure will be at the uppermost point on the gage, or in a direct vertical line from the center of the shaft 4. Any suitable means may be used to hold the dial in position. In the present instance, I have shown the casing 1 having a screw thread and a ring 7 adapted to the screw thread and having a flange 8, which overlaps the dial 3, so that when the ring overlaps the dial 3, so that when the ring 7 is screwed tightly on the casing it clamps the dial in the position to which it is set. Inclosing the dial is a sheet of glass 9, held in place by a ring 10, and while I have shown the method of securing the dial to the casing, it will be readily understood that other methods may be used without departing from the essential features of the invention.

I preferably coat or plate the pointer 5 with some luminous material, which will illuminate the pointer in the dark, and the figures and marks on the dial may also be illuminated in the same manner, dispensing with the use of a special lighting fixture at the gage.

If my improved gage is to be applied to a machine which is set to have a normal pressure of 80 lbs., then the dial of the gage is set with the numeral "80" at the upper portion of the dial on a direct vertical line through the shaft 4, as indicated in the drawing, and the pointer 5 is shifted on its shaft 4 to zero when no pressure is on the gage. When pressure is on the gage, the pointer will move from zero to the vertical position, if eighty pounds be carried.

If, when the machine is working, the pressure should drop, then the pointer will move out of the vertical position to the left, indicating at once to an observer that the machine is running below normal pressure, but if the pressure be increased, then the hand will move out of the normal position to the right and will indicate excessive pressure.

By illuminating the hand, the operator, or any observer, can see at a glance whether the machine is working under proper pressure. Where several machines are being used, for instance in groups under different pressures, a glance at the gages of the several machines will be sufficient for the operator to ascertain whether or not all of the machines are running under the predetermined pressures.

I claim:

1. A gage for indicating pressure or vacuum; a casing; a dial having indicating marks thereon, said dial being adjustable to nearly a complete circle; a shaft mounted in the casing; and a pointer adjustable on the shaft to approximately the same extent as the dial so that both the dial and the pointer can be adjusted so that when the normal pressure is carried the pointer will be in a vertical position.

2. The combination in a pressure gage, of a casing; a dial adapted to be moved so as to bring the mark indicating a predetermined pressure in position at the top of the gage; a shaft within the casing; and a pointer adjustably mounted on the shaft so that the pointer can be set at zero when no pressure is on the gage and the predetermined pressure mark on the dial is at the top of the gage so that the pointer will be in a vertical position when the machine is working under the predetermined pressure.

3. The combination in a gage, of a casing; a dial adjustably mounted in the casing so that it can be turned to bring any of the marks to the vertical position; means for clamping the dial to the casing; and a pointer adjustably mounted on the shaft so that the pointer can be set at zero when no pressure is on the gage and the predetermined pressure mark is at the top of the gage so that the pointer will be in a vertical position when the machine is working under predetermined pressure.

In witness whereof I affix my signature.

KENNETH RUSHTON.

Copies of this patent may be obtained for five cents each, by addressing the "Commissioner of Patents, Washington, D. C."